United States Patent [19]

Engelsmann et al.

[11] 4,115,792
[45] Sep. 19, 1978

[54] FILM TRANSPORT MECHANISM FOR CAMERAS

[75] Inventors: Dieter Engelsmann, Unterhaching; Hubert Hackenberg; Siegfried Zobel, both of Munich, all of Fed. Rep. of Germany

[73] Assignee: AGFA-Gevaert AG, Leverkusen, Fed. Rep. of Germany

[21] Appl. No.: 823,000

[22] Filed: Aug. 8, 1977

[30] Foreign Application Priority Data

Aug. 13, 1976 [DE] Fed. Rep. of Germany ....... 2636617

[51] Int. Cl.[2] .............................................. G03B 1/16
[52] U.S. Cl. ................................................. 354/213
[58] Field of Search ................ 354/204, 205, 206, 207, 354/212, 213, 214, 215, 216

[56] References Cited

U.S. PATENT DOCUMENTS

| 3,810,219 | 5/1974 | Fauth ....................................... 354/206 |
| 4,009,478 | 2/1977 | Yamashita ............................. 354/206 |

*Primary Examiner*—Michael L. Gellner

*Attorney, Agent, or Firm*—Michael J. Striker

[57] ABSTRACT

The user of the camera moves an input component to supply film-transport force. A rotary transmission transmits film-transport force fo the input component to the film in the camera, and includes first and second output components. When the input component is moved, the first output component is arrested and the second non-arrested, and then the second output component is arrested and the first non-arrested. A locking structure moves from a locking position arresting the first output component and an unlocking position releasing the first output component. A sensing mechanism responds to film frame advancement by entering into a film perforation, causing the locking structure to move to the unlocking position and causing the second output component to become arrested by the resistance of the film to transport. The transmission includes a gear driven by the input component and driving the second output component and displaceable mounting member mounting the gear for both rotation and displacement. The displaceable mounting member constitutes the first output component of the transmission.

13 Claims, 1 Drawing Figure

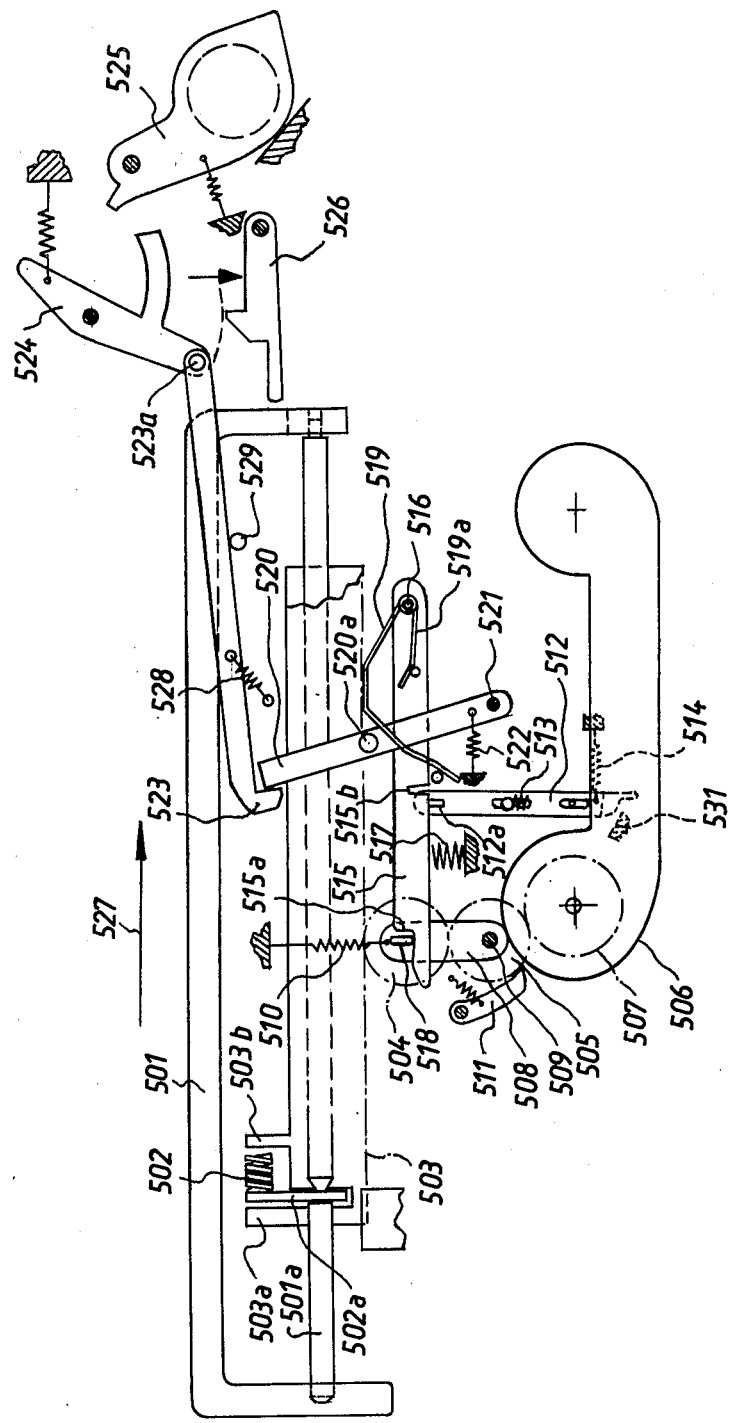

FILM TRANSPORT MECHANISM FOR CAMERAS

BACKGROUND OF THE INVENTION

The invention relates to a film-transport mechanism constituting an improvement upon the mechanism disclosed in commonly owned U.S. Pat. No. 3,810,219. The camera provided with that mechanism includes a manually driven input member supplying film-transport force coupled to the film take-up spool, and a device for assuring that the film is advanced by exactly the length of one frame, and utilizes a film transport transmission designed as a rotary transmission having two output components. One output component is a film drive member and the other output component is blocked during film-frame advancement by means of a locking mechanism and thereupon released, whereafter the film drive member becomes blocked. In particular, a perforation sensor enters into a film perforation near completion of the film-frame advancement and causes the locking mechanism to release the first output component, the subsequent arresting of the other output component being the result of the resistance of the film to further transport (provided by film friction and/or by detention of the film by the perforation sensor and/or by inherent friction of the transmission itself).

SUMMARY OF THE INVENTION

It is a general object to provide a film-transport mechanism of the type disclosed in the aforementioned patent, but of a simpler and easier to assemble construction.

This is achieved, according to one concept of the invention, by designing the first output component of the transmission as a rocker which mounts for swinging movement a gear driven by the input component and driving the second output component.

Preferably, the second output component is a rotatably mounted gear, and the pivot axis of the rocker coincides with the rotation axis of this second gear. This makes the transmission of extremely simple construction. In particular, simple gears can be used, and the mounting of the gears is quite direct and simple. The use of internal gearing and planet gears disclosed in the aforementioned patent is avoided, but all the advantages of the transmission taught in that patent are preserved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE depicts an exemplary embodiment of the invention.

DESCRIPTION OF THE PREFERRED EMBODIMENTS

In the FIGURE, 501 denotes a manually shiftable film-transport slide provided with a guide rod 501a. Mounted on the guide rod 501a is a member 502a cooperating with a compression spring 502 operative for limiting transmittable force. Also mounted on the guide rod 501a is a rack 503 provided with projections 503a, 503b between which the limiting spring 502 is confined. The rack 503 accordingly is capable of only limited movement relative to the film-transport slide 501.

A first gear 504 is always in engagement with the rack 503. First gear 504 is also in mesh with a second gear 505. When a film cassette 506 is inserted into the camera, second gear 505 meshes with a gear 507 coupled to the take-up spool of the cassette. First gear 504 is mounted for rotation at the free end of a rocker 508. Rocker 508 is mounted for swinging movement about an axis coincident with the rotation axis of second gear 505. A spring 510 coupled to the free end of rocker 508 is operative for urging rocker 508 towards its illustrated centered position, when the rocker 508 becomes displaced therefrom. Second gear 505 is furthermore in engagement with a ratchet 511 operative for preventing gear 505 from rotating in the direction opposite to that which effects film advancement.

The camera includes a perforation sensor 512. Each film frame is provided along one edge with a single perforation. A spring 513 urges perforation sensor 512 downward, so that it can enter into a film perforation near the completion of a film-frame advancement. A spring 514 urges the lower end of perforation sensor 512 rightward, i.e., opposite to the film transport direction. A locking lever 515 is mounted for swinging motion about a pivot pin 516. Locking lever 515 moves from its illustrated locking position downward to an unlocking position. When locking lever 515 is in its locking position, its blocking edge 515a is abutted against by a projection 518 on rocker 508, preventing rocker 508 from being swung away from its centered position. Locking lever 515 is also provided with a recess 515b into which a projection 512a on perforation sensor 512 can be received. A compression spring 517 urges locking lever 515 upward against the projection 518 at the free end of rocker 508. A spring 519 urges the locking lever 515 downward toward its unlocking position. Spring 519 is stronger than spring 517. A control lever 520 is mounted for movement about a pivot pin 521 and is urged leftward by a spring 522, so as to urge the free end of control lever 520 against a detent 523. At its other end, detent 523 is pivotally coupled by means of a pin 523a to a settable shutter drive member 524, operative after being set and then released for driving the shutter mechanism of the carmera, of which only one shutter blade 525 is shown. The shutter release is denoted by 526. It will be understood that the illustration of components 524–526 is only schematic, and that actually the shutter blade 525 will of course be located close to and in a plane parallel to the film in cassette 506. Accordingly, whereas the left end of detent 523 is shown pivotally coupled to the settable shutter drive member 524 directly, detent 523 will typically be pivotally coupled to an intermediate member or mechanism which is in turn coupled to the shutter drive member 524. Detent 523 is urged leftward by a spring 528 and slides upon a pin 529.

The operation of the illustrated embodiment is as follows:

When the user of the camera shifts the film-transport slide 501 in the direction of arrow 527, the rightward end of slide 501 rightwardly displaces an extension on pivot pin 523a causing the (schematically depicted) shutter drive member 524 to become set and cocked by shutter release 526. The rightward movement of pivot pin 523a causes detent 523 to be pulled rightward against the force of spring 528 and slide upon the pin 529.

The rightward shifting of detent 523 causes control lever 520 to pivot rightward. In so doing, a pin 520a on control lever 520 engages and stresses spring 519. Leg 519a of spring 519 urges locking lever 515 downward out of its (illustrated) locking position, but locking lever 515 cannot yet move downward because its lower edge bears upon projection 512a of perforation sensor 512.

During this movement of transport slide 501 in the direction of arrow 527, rack 503 is carried along in the same direction and rotates first gear 504. The force which rack 503 exerts upon first gear 504 can only effect rotation of this gear, and cannot yet pivot rocker 508, because projection 518 of rocker 508 abuts against the blocking edge 515a of locking lever 515, as a result of which rocker 508 is at this time maintained in its illustrated (12 o'clock) position relative to the rotation axis 509 of second gear 505.

As first gear 504 is rotated by rack 503, gear 504 in turn rotates second gear 505, and gear 505 rotates a gear 507 coupled to the film take-up spool, thereby effecting film transport in the desired direction.

When the film has been transported a distance somewhat less than the length of one film frame, the nose of perforation sensor 512 enters into the next film perforation, and during the completion of the single frame advancement is pulled leftward a small distance by the still transported film. As the nose of sensor 512 is pulled leftward in this way, its projection 512a moves rightward until it is in register with the recess 515b in the lower edge of locking lever 515, at which moment spring 519, 519a causes locking lever to drop down to unlocking position, and projection 512a becomes received in recess 515b.

With locking lever 515 now in its lowered unlocking position, rocker 508 is free to swing clockwise about the rotation axis 509 of second gear 505, and does so in response to continued movement of rack 503 in direction 527. Specifically, the rightward force exerted by the teeth of rack 503 upon the teeth of gear 504 causes the rocker 508 to tilt clockwise a small amount and simultaneously causes the first gear 504 to roll down upon the teeth of second gear 505. Gear 504 cannot at this time cause gear 505 to rotate to any appreciable degree, because gear 505 is practically blocked against rotation by the resistance of the film to further transport (i.e., as a result of film friction, gearing friction and/or the resistance offered by the nose of sensor 512). This is in contrast to the situation prior to release of rocker 508; when rocker 508 was blocked against tilting movement, the rightward movement of rack 503 could only be converted into rotation of gears 504 and 505 and so the resistance presented to second gear 505 by the film's resistance to transport was necessarily overcome.

As the rocker 508 tilts from its 12 o'clock position to its 12:15 o'clock position, the teeth of gear 504 are in mesh with the teeth of both rack 503 and gear 505. The teeth of gear 504 remain in mesh with those of gear 504 without interruption. However, when the rocker 508 reaches its 12:15 o'clock position, the teeth of rightward moving rack 503, although still and always in engagement with those of gear 504, begin to skip rightward relative to those of gear 504. As rack 503 continues to move rightward, the rocker 508 remains in its 12:15 o'clock position, and although the teeth of rack 503 continually skip over the teeth of gear 504 the teeth of 503 and 504 are maintained in uninterrupted engagement by means of the centering spring 510 which attempts to restore the rocker 508 to its centered position.

During continued rightward movement of slide 501 and rack 503 — i.e., subsequent to completion of a single frame advancement — auxiliary operations can be initiated and completed or if already initiated completed. In the illustrated embodiment, when slide 501 commences to move rightward, gears 504, 505, 507 almost immediately begin to effect film transport and shortly thereafter the right end of slide 501 begins to set the (schematically depicted) shutter drive mechanism. Completion of the setting of the shutter drive mechanism (or another auxiliary operation) can be effected prior to completion of the single frame advancement, or vice versa. Other examples of auxiliary operations include the indexing of a flash cube and the cocking of an impact mechanism for a piezoelectrically fired flash unit.

When all operations (single frame advancement and auxiliary operations) are completed and rightward movement of slide 501 is terminated, the slide 501 is moved leftward back to its starting position. Accordingly, when the return movement of rack 503 commences, the leftward force exerted by rack 503 on gear 504 causes rocker 508 to tilt from its 12:15 o'clock position back to its 12 o'clock position and then, for the same reasons that it tilted to its 12:15 o'clock position, further on to its 11:45 o'clock position. During continued leftward movement of rack 503, rocker 508 remains in its 11:45 o'clock position, with the teeth of rack 503 skipping leftward over the teeth of gear 504. Rotation of gear 505 by gear 504 (which would now be in the direction opposite to that for film advancement) is precluded by the ratchet mechanism 511. When the leftward or return movement of slide 501 is completed, rocker 508 will tend to reassume its illustrated centered position.

With the return movement of slide 501 completed, the user of the camera may, for example, activate release 526, causing the (schematically depicted) shutter mechanism 525, 526 to perform an exposure operation. When shutter drive member 524 is thusly released, detent 523 moves leftward back towards its original position, under the action of spring 528. As a result, spring 522 is able to pivot control lever 520 leftward back to the original position of the control lever, thereby disengaging pin 520a from spring 519, 519a, the force of spring 517 again predominates, and locking lever 515 is raised back to its illustrated locking position. Accordingly, if now the slide 501 is again activated, the movement of rack 503 in the direction of arrow 527 will again effect the operations described above. Furthermore, when slide 501 is again activated, the nose of sensor 512 will, at first, still be engaged in a film perforation. Thus, during a very short initial phase of the film transport, the sensor 512 will be pulled clockwise by the transported film. Very soon, however, the nose of sensor 512 is pushed out of the perforation by a small cam 531. As soon as the nose of sensor 512 emerges from the perforation, biasing spring 514 pulls the nose rightward, i.e., so that the nose again rides upon the surface of the film and awaits the arrival of the next-following film perforation.

From the foregoing, it will be understood that the present invention constitutes a simpler version of the system disclosed in commonly owned U.S. Pat. No. 3,810,219, but exhibits all the characteristic operational advantages of the earlier system. It comprises a rotary transmission having two outputs 508 and 505. During a single frame advancement, one output 508 is blocked whereas the other 505 is not blocked; upon completion of the single frame advancement, output 508 becomes unblocked whereas output 505 becomes blocked by virtue of the resistance of the film to further transport (attributable to film friction and/or gearing friction and/or the resistance presented by sensor 512). However, the transmission of the present invention is evidently considerably simpler than the planetary transmission of the earlier patent.

It will be understood that modifications of the exemplary embodiment are possible. Just by way of example, the lever and spring arrangement 520, 519 could be replaced by a lever or cam transmission operative for controlling locking lever 515. Likewise, the illustrated rocker 508 is preferred, because the pivoting of gear 504 upon completion of a single frame advancement keeps the gear 504 in uninterrupted engagement with both its driving member 503 and its driven member 504; however, gear 504 could alternatively be mounted for linear displacement upon release of locking lever 515, i.e., instead of swinging displacement.

It will be understood that each of the elements described above, or two or more together, may also find a useful application in other types of constructions differing from the types described above.

While the invention has been illustrated and described as embodied in a film-transport mechanism for perforated cassette film, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a photographic roll-film camera, a film-transport arrangement comprising, in combination, means defining a path of travel for film within the camera; an input component mounted for movement by the user of the camera to supply film-transport force; a rotary transmission mechanically coupled to the input component for transmitting film-transport force from the input component to film in the camera, the transmission including first and second output components; and arresting means operative for causing the first output component to be arrested and the second output component non-arrested and for then causing the second output component to be arrested and the first output component non-arrested, the arresting means comprising locking means displaceable between a locking position arresting the first output component and an unlocking position releasing the first output component, and sensing means operative in response to film frame advancement for entering into a film perforation, causing the locking means to move to the unlocking position and causing the second output component to become arrested by the resistance of the film to transport, the transmission including a gear driven by the input component and driving the second output component and a rocker mounting the gear for both rotation and swinging movement, the rocker constituting the first output component of the transmission.

2. In a camera as defined in claim 1, the rocker being provided with an engaging portion, the locking means including a locking lever mounted for movement between a locking position in which the locking lever engages the engaging portion and arrests the rocker and an unlocking position in which the locking lever releases the rocker.

3. In a camera as defined in claim 2, the engaging portion of the rocker being located coincident with the rotation axis of the gear mounted on the rocker.

4. In a camera as defined in claim 2, including biasing means operative when the locking lever is in the unlocking position for urging the rocker towards a predetermined centered position by applying to the rocker a biasing force resisting the force applied to the rocker from the input component.

5. In a camera as defined in claim 2, the sensing means including a perforation sensing member and means mounting the sensing member for entry into a film-frame perforation just prior to completion of a film-frame advancement and for displacement by transported film during the remainder of the film-frame advancement, the locking lever being provided with a recess, the perforation sensing member being provided with a projection located to normally prevent the locking lever from leaving the locking position but positioned to enter into the recess in the locking lever upon completion of the film-frame advancement to permit the locking lever to leave the locking position thereof.

6. In a camera as defined in claim 2, including biasing means operative for applying to the locking lever a biasing force tending to maintain the locking lever in the locking position thereof.

7. In a camera as defined in claim 2, the camera being provided with a settable and releasable mechanism, the mechanism including energy-storing means, the mechanism being settable against the force of the energy-storing means to a setting in which the energy-storing means stores potential energy for subsequent release of the settable and releasable mechanism; the camera including means operative for transmitting setting force to the settable mechanism from the input component, the arresting means including means operative in response to setting of said mechanism for applying to the locking lever a force tending to move the locking lever to the unlocking position and operative in response to release of said mechanism for applying to the locking lever a force tending to move the locking lever to the locking position.

8. In a camera as defined in claim 7, the means responsive to setting and release of said mechanism including biasing means operative when stressed for exerting upon the locking lever a force tending to move the locking lever to the unlocking position, a control lever, and means mounting the control lever for movement between a position in which the control lever stresses the biasing means in response to setting of said mechanism and a position in which the control lever unstresses the biasing means in response to release of said mechanism.

9. In a camera as defined in claim 8, the biasing means constituting first biasing means, the arresting means further including additional biasing means operative for applying to the locking lever a biasing force tending to maintain the locking lever in the locking position, the biasing force applied to the locking lever by the stressed first biasing means overcoming the biasing force applied to the locking lever by the further biasing means.

10. In a camera as defined in claim 1, the input component comprising a manually driven member and coupled thereto a rack operative for driving the gear mounted on the rocker.

11. In a camera as defined in claim 10, further including biasing means coupling the manually driven member and the rack and operative for limiting the force which can be transmitted from the manually driven member through the rack to the gear mounted on the rocker.

12. In a camera as defined in claim 1, said gear being a first gear, the second output component of the transmission being a second gear meshing with the first and mounted for rotation, the rocker being mounted for swinging movement about an axis coincident with the rotation axis of the second gear, whereby when the rocker is arrested the input component rotates the second gear through the intermediary of the first whereas when the rocker is released the input component causes the rocker to swing and the first gear mounted thereon to roll upon the second gear without rotating the second gear.

13. In a photographic roll-film camera, a film-transport arrangement comprising, in combination, means defining a path of travel for film within the camera; an input component mounted for movement by the user of the camera to supply film-transport force; a transmission mechanically coupled to the input component for transmitting film-transport force from the input component to the film in the camera, the transmission including first and second output components; and arresting means operative for causing the first output component to be arrested and the second output component non-arrested and for then causing the second output component to be arrested and the first output component non-arrested, the arresting means comprising locking means displaceable between a locking position arresting the first output component and an unlocking position releasing the first output component, and sensing means operative in response to a film frame advancement for entering into a film perforation, causing the locking means to move to the unlocking position and causing the second output component to become arrested by the resistance of the film to transport, the transmission including a gear driven by the input component and driving the second output component and a mounting member mounting the gear for both rotation and displacement, the mounting member constituting the first output component of the transmission.

* * * * *